March 2, 1937.  V. H. JONES  2,072,754
DISPLAY DEVICE
Filed May 29, 1936  2 Sheets-Sheet 1
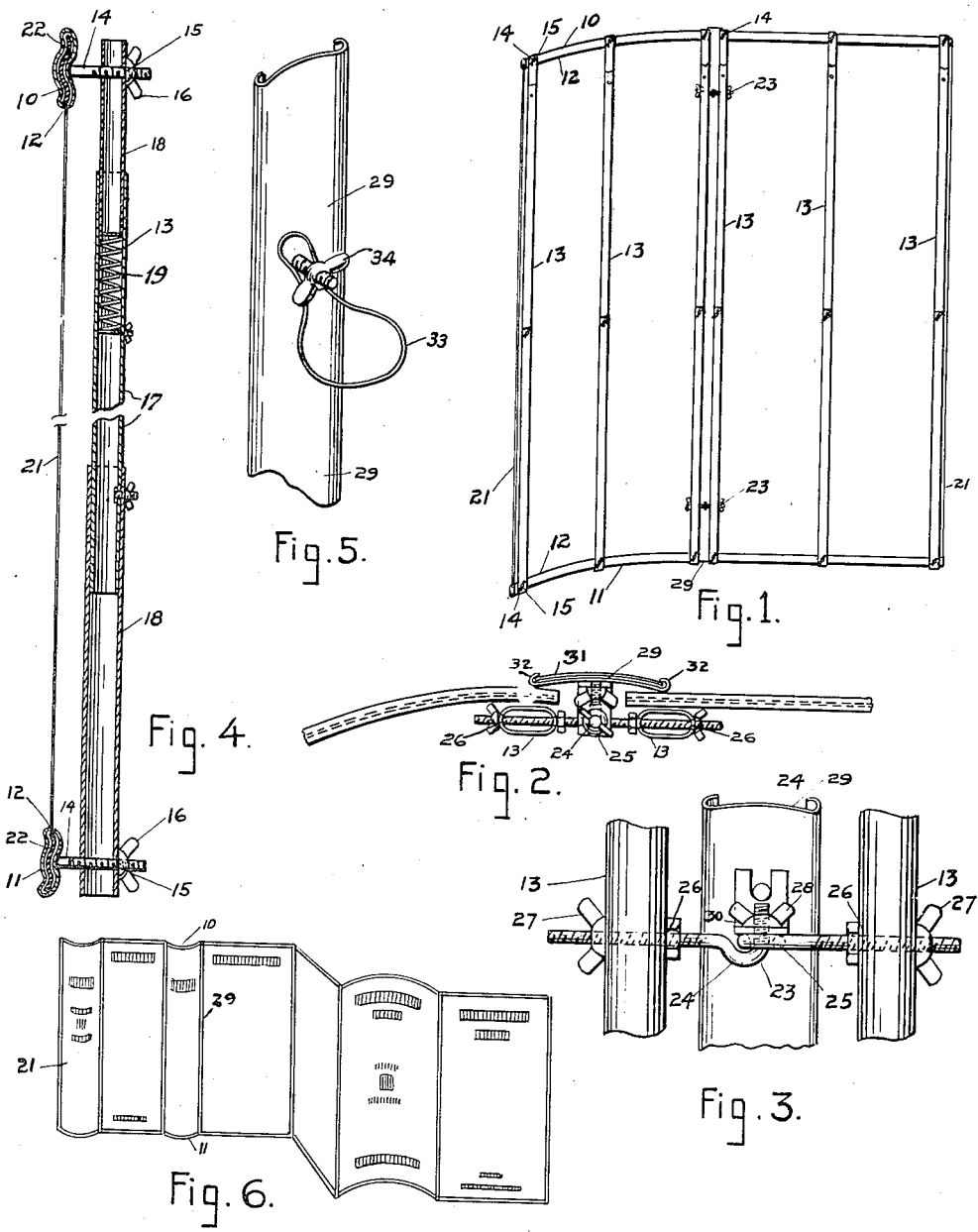
INVENTOR.
Vernon H. Jones
BY James R. McKnight
ATTORNEY.

March 2, 1937.　　　V. H. JONES　　　2,072,754
DISPLAY DEVICE
Filed May 29, 1936　　　2 Sheets-Sheet 2

INVENTOR.
Vernon H. Jones
BY James R. McKnight
ATTORNEY.

Patented Mar. 2, 1937

2,072,754

UNITED STATES PATENT OFFICE 2,072,754

DISPLAY DEVICE

Vernon H. Jones, Park Ridge, Ill.

Application May 29, 1936, Serial No. 82,404

10 Claims. (Cl. 40—125)

Among the objects of my invention are to create a display device in which paper or other flexible material is stretched so that it has the appearance of a heavier and permanent display requiring considerable labor and construction; to create a device adapted to stretch paper in straight or curved lines forming in appearance flat or curved panels; to provide a display device having receiving and holding members peculiarly shaped so as to only receive posters having correspondingly peculiar cut end portions; to provide display devices adapted so that a plurality of them may be used to form a complete window setting or floor display; to create flexible connecting members for attaching one display unit to another, said flexible connections being so formed that they may be used regardless of the contours of the units to be attached to each other; to supply pilasters having paper receiving portions whereby said pilasters may be covered with paper to match or contrast with the paper of the posters; to provide a display device in which the poster may be instantly inserted or withdrawn so that the display device may be continuously used for different posters as often as change is desired by the user; to provide a display device adjustable to different sizes of posters; to create a display device easily assembled and disassembled and therefore easily adapted to economical shipment; to provide a display device using flexible materials available for shipment and storage in tubes, and inexpensive enough to be thrown away after use, and such other objects, advantages and capabilities as will later more fully appear and which are inherently possessed by my invention.

Since many of the display devices of the past have been constructed of wood, fabric, metal or other expensive and permanent material involving heavy shipment costs and available for a limited use, the adaptability and opportunity for change, the perfect appearance and economy of my display device are a great utility and advantage to users.

Figures 8, 9, 10:
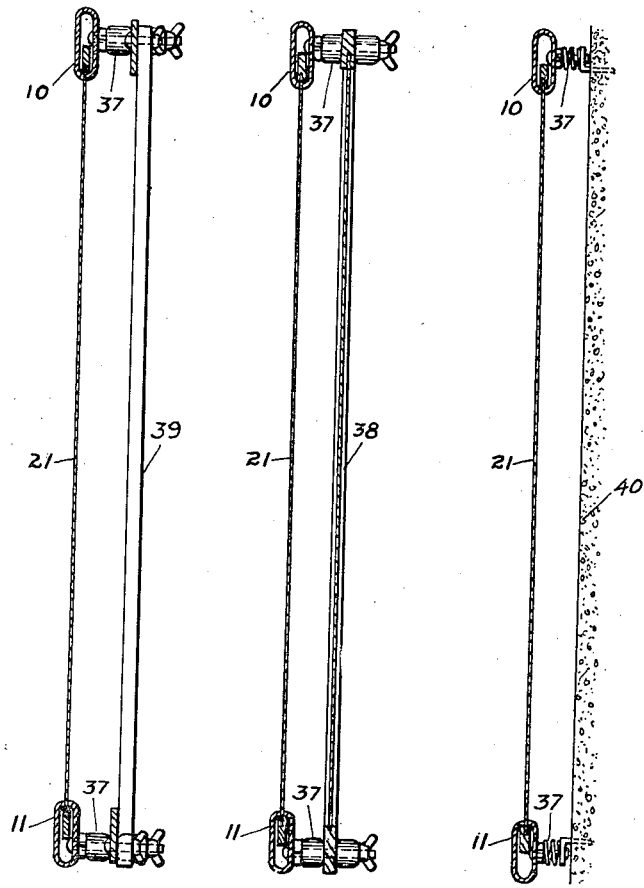
Figure 11:
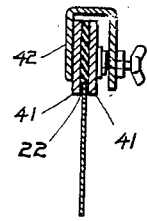
Figure 7:
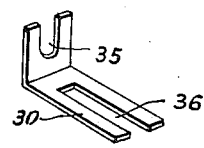

Referring to the drawings, Fig. 1 is a rear elevation of two display units joined to form part of a window or floor display; Fig. 2 is a detailed plan view of my connecter with pilaster in place between two of my display device units; Fig. 3 is a rear detailed view showing my connecter in place; Fig. 4 is a sectional side detailed view of my stretching member and peculiarly shaped key channel and inserted strip with poster; Fig. 5 is a detail view of a resilient member attached to a hook on the back of my pilaster; Fig. 6 is a front view of a plurality of my display device units illustrating several curved and straight line formations; Fig. 7 is a detail view of my angle member. Figs. 8, 9, and 10 are sectional views of my display device with Fig. 8 showing a skeleton support, Fig. 9 a solid panel support, and Fig. 10 my device connected to and supported by a wall; Fig. 11 is a sectional view of a different embodiment of my holding members.

Referring more particularly to the embodiment selected to illustrate my invention, it comprises top and bottom keyhole channel members 10 and 11 respectively. Both of these members are alike and in use, of course, are positioned so that the keyways 12 face each other. Extending between the channel members 10 and 11 are a plurality of stretching members 13. These stretching members are removably attached to the channel members by suitable means such as a bolt 14 passing through a hole 15 adjacent the end of each of the stretching members and a thumb nut 16.

While I have shown in Fig. 1 of the drawings a plurality of stretching members, yet I wish it understood that I may employ only two or one stretching member with each of my display device units. There may be times too when the stretching member 13 may be eliminated entirely as in Figs. 8, 9, and 10. In such cases keyhole channels would be attached over other panels 38 as shown in Fig. 9 or other structure for support such as a skeleton structure 39 as shown in Fig. 8 or a wall 40 as shown in Fig. 10 and the stretch would be applied to the poster by a small spring or other resilient material 37 used between one or both of the keyhole channels and the supporting structure.

Each of my stretching members 13 has a body member 17 and at either end an extension member 18 slidable in or on said body member. The upper portion of Fig. 4 shows the extension 18 slidable into body member 17, while the lower portion of Fig. 4 illustrates extension 18 slidable around body member 17. Also adjacent each of the upper and lower ends of the body member of each of my stretching members a resilient member 19 is attached by suitable means at its inner end. Said resilient member contacts at its outer end the extension 18. A poster 21 has attached to its upper and lower ends a flexible key strip 22. Said key strip 22 is adapted to fit into the keyways 12 of the upper and lower channel members 10 and 11.

As shown in Fig. 4 the keyways 12 of the upper and lower channel members 10 and 11 are peculiarly shaped so as to admit only a key strip 22 cut to match said keyways. The figure in the drawings illustrates one particular form of keyhole shape and matching key strip, but this shape is merely illustrative of my invention, the idea of which is to have the channel members so shaped that only key strips having a matching shape may be received by said channel members. I am not interested in the particular form of the keyway and key strip, but in the creation of a peculiarly shaped channel member adapted to only admit a correspondingly peculiarly shaped key strip.

My poster 21 is of any flexible material preferably paper and is adapted to have marked on it advertising or descriptive matter. In use my poster 21 is set up by inserting the upper and lower flexible key strips 22 into the upper and lower channel members 10 and 11. The extension members 18 are adjusted so that the resilient members 19 exert the proper thrust so as to stretch the poster taut in the shape of the channel members.

My channel members may be curved so as to present a concave or convex surface or variations thereof, or my channel members may have straight lines or even angle turns. In this way I am able to provide for substantially any shape of display and when a plurality of my display devices are used having different curving and straight surfaces a great variety of shapes in one window or floor display is possible, thus resulting in a most attractive and artistic presentation.

As my display devices are practically always used in groups to complete a window or floor display, I provide an adjustable connecter 23 formed to pass through an opening in each of two adjacent stretching members. My connecting member is formed with a hook portion 24 and an eye portion 25. As shown in Fig. 3 of the drawings the end of my hook portion 24 passes through an opening 26 of an outside stretching member 13 of one of my display device units. It is positioned there by suitable means such as a thumb nut 27. As the hook portion of my connecter bends upwardly it holds the loop portion of the eye between a thumb nut 28. The outer portion of the eye 25 then passes through an opening 26 in the adjacent stretching member of the adjoining display device unit. It will be noted that my connecter may be used to connect display device units regardless of their shape or contour thus eliminating the necessity of a plurality of different kinds of connecters. The eye portion of my connecter is adapted to fit into any other suitable support in addition to the stretching members. For example, when said eye portion is at the end of the entire window or floor display it may be used to position the structure by insertion into the wall or other permanent support. Users of these connecting fasteners can also use them on permanently constructed panels and supporting structures.

To cover the space between my display device units I employ a pilaster 29 having on its back portion a plurality of hooks 34 around which I loop resilient members 33 such as rubber bands or the like. Said resilient members 33 are stretched to hook over the thumb nut of the connecter 23 and thus hold the pilaster in position. In cases where a more permanent arrangement is desired to hold the pilaster in position, the hooks 34 on the backs of the pilasters 29 may be inserted into an upper slot 35 of an angle member 30. The lower slot 36 of the angle member 30 is inserted into and held by thumb nut 28 of connecters 23.

My pilaster may also have curved portions 32 on its edges to hold an inserted strip of paper 31 thereby covering the face of the pilaster. This provision is desirable at times so that the pilaster may then be covered with paper to harmonize with the paper or the like of the poster.

It is also within the contemplation of my invention that instead of the channel members 10 and 11 that I employ a bar or pair of bars 41 having the desired curve or straight surface. My flexible strip 22 would then be held tight against the bar or between the bars by suitable clamping members as shown in Fig. 11.

Having thus described my invention I claim:

1. A display device comprising a poster of flexible material, flexible means on the ends of said poster for reinforcing the same, a pair of oppositely disposed members for removably holding the reinforced end portions of said poster and means attached to said holding members for stretching said poster taut so as to conform to the shape of the holding members.

2. A display device comprising a poster of flexible material, flexible means on the ends of said poster for reinforcing the same, a pair of oppositely disposed curved members for removably holding the reinforced end portions of said poster and means attached to said holding members for stretching said poster taut so as to conform to the curve of the holding members.

3. A display comprising a plurality of display devices, each of said devices having a poster of flexible material, a pair of oppositely disposed members for removably holding the opposite portions of said poster, and a plurality of stretching members attached to said holding members for stretching said poster taut so as to conform to the shape of the holding members, and a connecter for removably attaching a stretching member of one display device to a stretching member of an adjoining device.

4. A display comprising a plurality of display devices, each of said devices having a poster of flexible material, a pair of oppositely disposed members for removably holding the opposite portions of said poster, and a plurality of stretching members attached to said holding members for stretching said poster taut so as to conform to the shape of the holding members, and a connecter for removably attaching a stretching member of one display device to a stretching member of an adjoining device, and a pilaster between each of said display devices attached to and hiding said connecter from view.

5. A display comprising a plurality of display devices, each of said devices having a poster of flexible material, a pair of oppositely disposed members for removably holding the opposite portions of said poster, and supporting means attached to said holding members for stretching said poster taut so as to conform to the shape of the holding members, and a connecter for removably attaching the supporting means of one display device to the supporting means of an adjoining device, and a pilaster between each of said display devices attached to and hiding said connecter from view.

6. A display device comprising a poster of flexible material, a pair of oppositely disposed holding members, said holding members having a peculiarly shaped keyway, said poster having reinforced flexible end portions peculiarly shaped to match and fit into the keyway of said holding members, and means attached to said holding members for stretching said poster taut so as to conform to the shape of said holding members.

7. In a display formed of several poster display units, a pilaster between each of the units of said display, said pilaster having a protruding member on its back portion, a connection structure for connecting said units, an angle member held in position by said connecting structure, said angle member having a slot for receiving the protruding member of said pilaster to hold the same in fixed position.

8. A display device comprising a poster of flexible material having a reinforcing strip attached to its opposite ends, a pair of oppositely disposed members for removably holding the opposite ends of said poster, and resilient members attached to said holding members for stretching said poster taut so as to conform to the shape of the holding members.

9. A display comprising a plurality of display units, each of said units having a poster of flexible material and means for removably holding and stretching said posters, connecters for removably attaching adjoining units together, a pilaster between each of said display devices attached to and hiding said connecters from view, each of said pilasters having curved outer edges and a strip of flexible material inserted and held between said curved outer edges of said pilasters for substantially covering said pilasters and for harmonizing or contrasting with the material of said posters.

10. A display comprising a plurality of display units, each of said units having a poster of flexible material, a pair of oppositely disposed members for removably holding the opposite portions of said poster, and supporting means attached to said holding members for stretching said poster taut so as to conform to the shape of the holding members, a connecter for removably attaching the supporting means of one unit to the supporting means of an adjoining unit, said connecter comprising a hook member with its outer end passing through an opening in the supporting means of one unit and means for removably holding said end in fixed position, said connecter having an eye member with the eye swingably fitted into the inner end of the hook member and held therein by removable means, the outer end of said eye member extending through an opening in a supporting member of the adjoining unit and means for removably holding said outer end in fixed position.

VERNON H. JONES.